United States Patent
Park et al.

(10) Patent No.: US 7,667,233 B2
(45) Date of Patent: Feb. 23, 2010

(54) DISPLAY DEVICE, FLAT LAMP AND METHOD OF FABRICATING THE DISPLAY DEVICE AND FLAT LAMP

(75) Inventors: Hyoung-Bin Park, Suwon-si (KR); Seung-Hyun Son, Suwon-si (KR); Sang-Hun Jang, Suwon-si (KR); Gi-Young Kim, Suwon-si (KR); Sung-Soo Kim, Suwon-si (KR); Ho-Nyeon Lee, Suwon-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 345 days.

(21) Appl. No.: 11/601,690

(22) Filed: Nov. 20, 2006

(65) Prior Publication Data
US 2007/0117251 A1 May 24, 2007

(30) Foreign Application Priority Data
Nov. 22, 2005 (KR) ...................... 10-2005-0111982

(51) Int. Cl.
*H01L 29/04* (2006.01)
(52) U.S. Cl. .......................................... 257/59; 438/62
(58) Field of Classification Search .................. 257/59, 257/72
See application file for complete search history.

(56) References Cited

U.S. PATENT DOCUMENTS 6,791,248 B2 *  9/2004  Komoda et al. ............. 313/310
2004/0178726 A1 *  9/2004  Yamagata et al. ........... 313/506
2005/0121675 A1 *  6/2005  Maekawa et al. ............. 257/72
2005/0127371 A1 *  6/2005  Yamazaki et al. ............. 257/72
2005/0139920 A1 *  6/2005  Koeda ........................ 257/347
2005/0174059 A1 *  8/2005  Obratsov .................... 313/634
2005/0264161 A1 * 12/2005  Oaku et al. .................. 313/486
2006/0119250 A1 *  6/2006  Suehiro et al. ............... 313/498
2006/0186786 A1 *  8/2006  Iwamatsu et al. ........... 313/495
2007/0258022 A1 * 11/2007  Takechi et al. ................ 349/63

* cited by examiner

*Primary Examiner*—Thao P. Le
(74) *Attorney, Agent, or Firm*—Stein McEwen, LLP

(57) ABSTRACT

A display device and a flat lamp that have simple structures and can be fabricated using simple fabricating processes, and a method of fabricating the display device and the flat lamp. The display device includes: a first substrate and a second substrate facing each other across a predetermined distance; barrier ribs defining light emitting cells with the first substrate and the second substrate; an anode electrode disposed in the light emitting cell; a conductive silicon layer disposed on an inner surface of one of the first and second substrates; an oxidized porous silicon layer, at least a part of which is disposed on the conductive silicon layer; and a gas contained in the light emitting cell. The fabrication method includes doping part of a silicon layer on the inner surface of the first or second substrate and changing another part of the silicon layer to an oxidized porous silicon layer.

20 Claims, 4 Drawing Sheets

DISPLAY DEVICE, FLAT LAMP AND METHOD OF FABRICATING THE DISPLAY DEVICE AND FLAT LAMP

CROSS-REFERENCE TO RELATED PATENT APPLICATIONS

This application claims the benefit of Korean Application No. 2005-111982, filed Nov. 22, 2005, in the Korean Intellectual Property Office, the disclosure of which is incorporated herein in its entirety by reference.

BACKGROUND OF THE INVENTION

1. Field of the Invention

Aspects of the present invention relate to a display device and a flat lamp, and more particularly, to a display device and a flat lamp that have simple structures and can be fabricated using simple processes, and a method of fabricating the display device and the flat lamp.

2. Description of the Related Art

Plasma display panels (PDPs) that are considered to substitute for conventional cathode ray tubes (CRTs) are flat panel display apparatuses. In the PDPs, a discharge gas is contained between two substrates, on which a plurality of electrodes is formed, a discharge voltage is applied to the discharge gas to generate ultraviolet rays, and then, the ultraviolet rays excite phosphor layers formed in a predetermined pattern to emit visible rays and to display a desired image.

Generally, plasma display panels use a discharge gas, for example, Xe. During the discharge, gas is ionized and a plasma discharge occurs, the excited Xe is stabilized while generating ultraviolet rays.

However, in order to display images in a typical plasma display panel, a high energy that can ionize the discharge gas is required, and thus, a high driving voltage is applied. However, the luminous efficiency of the plasma display panel is relatively low.

In addition, the typical plasma display panel has a complex structure, and thus, costs for manufacturing the display are high and it is difficult to realize a high image resolution. Therefore, display apparatuses having new structures should be developed.

SUMMARY OF THE INVENTION

Several aspects and example embodiments of the present invention provide a display device having a simple structure that can be fabricated using simple manufacturing processes, a flat lamp, and a method of fabricating the display device and the flat lamp.

In accordance with an example embodiment of the present invention, there is provided a display device including: a first substrate and a second substrate facing each other with a predetermined distance; barrier ribs defining a light emitting cell with the first substrate and the second substrate; an anode electrode disposed in the light emitting cell; a conductive silicon layer disposed on an inner surface of one of the first substrate and the second substrate; an oxidized porous silicon layer, at least a part of which is disposed on the conductive silicon layer; and a gas filled in the light emitting cell.

According to an aspect of the present invention, the anode electrode may extend in a predetermined direction, and the conductive silicon layer may extend in a direction crossing the anode electrode.

According to an aspect of the present invention, the conductive silicon layer may be formed by doping a polysilicon layer, and the oxidized porous silicon layer may be an oxidized porous polysilicon layer.

According to an aspect of the present invention, the display device may further include a polysilicon layer between the conductive silicon layer and the oxidized porous silicon layer.

According to an aspect of the present invention, the conductive silicon layer may be formed by doping an amorphous silicon layer, and the oxidized porous silicon layer may be an oxidized porous amorphous silicon layer.

According to an aspect of the present invention, the display device may further include an amorphous silicon layer between the conductive silicon layer and the oxidized porous silicon layer.

According to an aspect of the present invention, an emission electrode may be disposed on the oxidized porous silicon layer.

According to an aspect of the present invention, a phosphor layer may be disposed in the light emitting cell.

According to an aspect of the present invention, the phosphor layer may include one selected from the group consisting of a photoluminescent phosphor, a cathodoluminescent phosphor, and a quantum dot.

According to an aspect of the present invention, the gas may include one selected from the group consisting of $Xe$, $N_2$, $D_2$, $CO_2$, $H_2$, $CO$, $Ne$, $He$, $Ar$, air of atmospheric pressure, and $Kr$.

In accordance with another example embodiment of the present invention, there is provided a flat lamp including: a first substrate and a second substrate facing each other with a predetermined distance; barrier ribs defining a light emitting cell with the first substrate and the second substrate; an anode electrode disposed in the light emitting cell; a conductive silicon layer disposed on an inner surface of one of the first substrate and the second substrate; an oxidized porous silicon layer, at least a part of which is disposed on the conductive silicon layer; and a gas filled in the light emitting cell.

According to an aspect of the present invention, a phosphor layer may be disposed in the light emitting cell.

According to an aspect of the present invention, the phosphor layer may include one selected from the group consisting of a photoluminescent phosphor, a cathodoluminescent phosphor, and a quantum dot.

In accordance with yet another example embodiment of the present invention, there is provided a display device including: a first substrate and a second substrate facing each other with a predetermined distance; barrier ribs defining a light emitting cell with the first substrate and the second substrate; a conductive silicon layer disposed on an inner surface of one of the first substrate and the second substrate; an oxidized porous silicon layer, at least a part of which is disposed on the conductive silicon layer; an emission electrode, at least a part of which is disposed on the oxidized porous silicon layer; and a gas filled in the light emitting cell.

According to an aspect of the present invention, the conductive silicon layer may be formed by doping a poly silicon layer, and the oxidized porous silicon layer is an oxidized porous poly silicon layer.

According to an aspect of the present invention, the display device may further include a poly silicon layer between the conductive silicon layer and the oxidized porous silicon layer.

According to an aspect of the present invention, the conductive silicon layer may be formed by doping an amorphous silicon layer, and the oxidized porous silicon layer is an oxidized porous amorphous silicon layer.

According to an aspect of the present invention, the display device may further include an amorphous silicon layer between the conductive silicon layer and the oxidized porous silicon layer.

According to an aspect of the present invention, a phosphor layer may be disposed in the light emitting cell.

According to an aspect of the present invention, the phosphor layer may include one selected from the group consisting of a photoluminescent phosphor, a cathodoluminescent phosphor, and a quantum dot.

According to an aspect of the present invention, the gas may include one selected from the group consisting of Xe, $N_2$, $D_2$, $CO_2$, $H_2$, CO, Ne, He, Ar, air of atmospheric pressure, and Kr.

In accordance with yet another example embodiment of the present invention, there is provided a flat lamp including: a first substrate and a second substrate facing each other with a predetermined distance; barrier ribs defining a light emitting cell with the first substrate and the second substrate; a conductive silicon layer disposed on an inner surface of one of the first substrate and the second substrate; an oxidized porous silicon layer, at least a part of which is disposed on the conductive silicon layer; an emission electrode, at least a part of which is disposed on the oxidized porous silicon layer; and a gas filled in the light emitting cell.

According to an aspect of the present invention, a phosphor layer may be disposed in the light emitting cell.

According to an aspect of the present invention, the phosphor layer may include one selected from the group consisting of a photoluminescent phosphor, a cathodoluminescent phosphor, and a quantum dot.

In accordance with yet another example embodiment of the present invention, there is provided a method of fabricating a display device, the method including: forming a silicon layer on an inner surface of a substrate; doping at least a part of the silicon layer to form a conductive silicon layer; and changing at least a part of the silicon layer to an oxidized porous silicon layer.

According to an aspect of the present invention, the silicon layer may include poly silicon.

According to an aspect of the present invention, the silicon layer may include amorphous silicon.

According to an aspect of the present invention, the silicon layer may be formed using a plasma enhanced chemical vapor deposition (PECVD) method.

According to an aspect of the present invention, the oxidized porous silicon layer may be formed by anodizing at least a part of the silicon layer using the conductive silicon layer as an anodizing electrode.

According to an aspect of the present invention, the method may further include: forming an auxiliary electrode on the inner surface of the substrate before forming the silicon layer on the inner surface of the substrate, in order to supply electric power to the conductive silicon layer sufficiently during the anodizing.

In accordance with yet another example embodiment of the present invention, there is provided a method of fabricating a flat lamp, the method including: forming a silicon layer on an inner surface of a substrate; doping at least a part of the silicon layer to form a conductive silicon layer; and changing at least a part of the silicon layer to an oxidized porous silicon layer.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXAMPLE EMBODIMENTS

Figure 1:
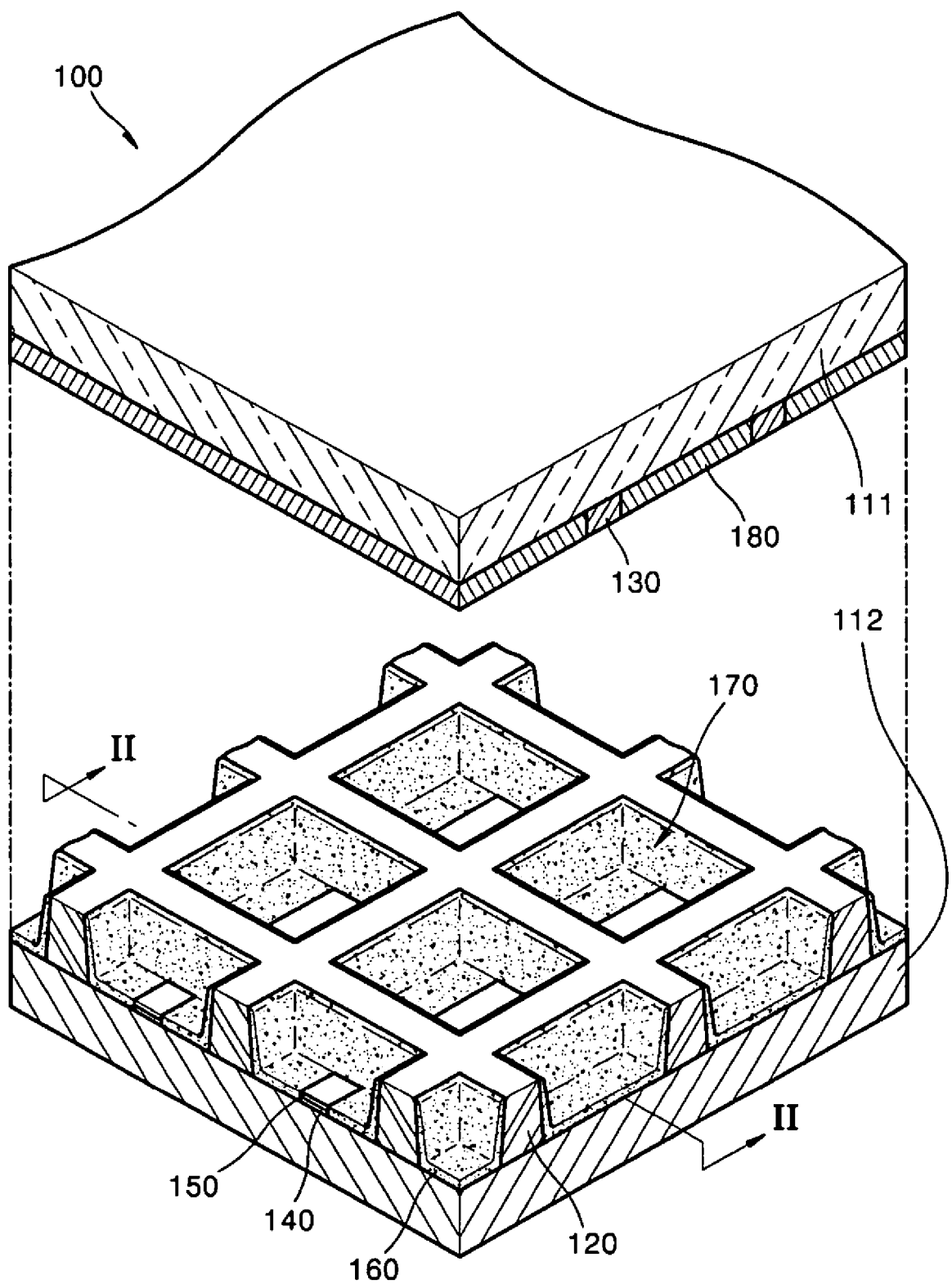
FIG. 1 is a partially cut perspective view of a display device according to an example embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
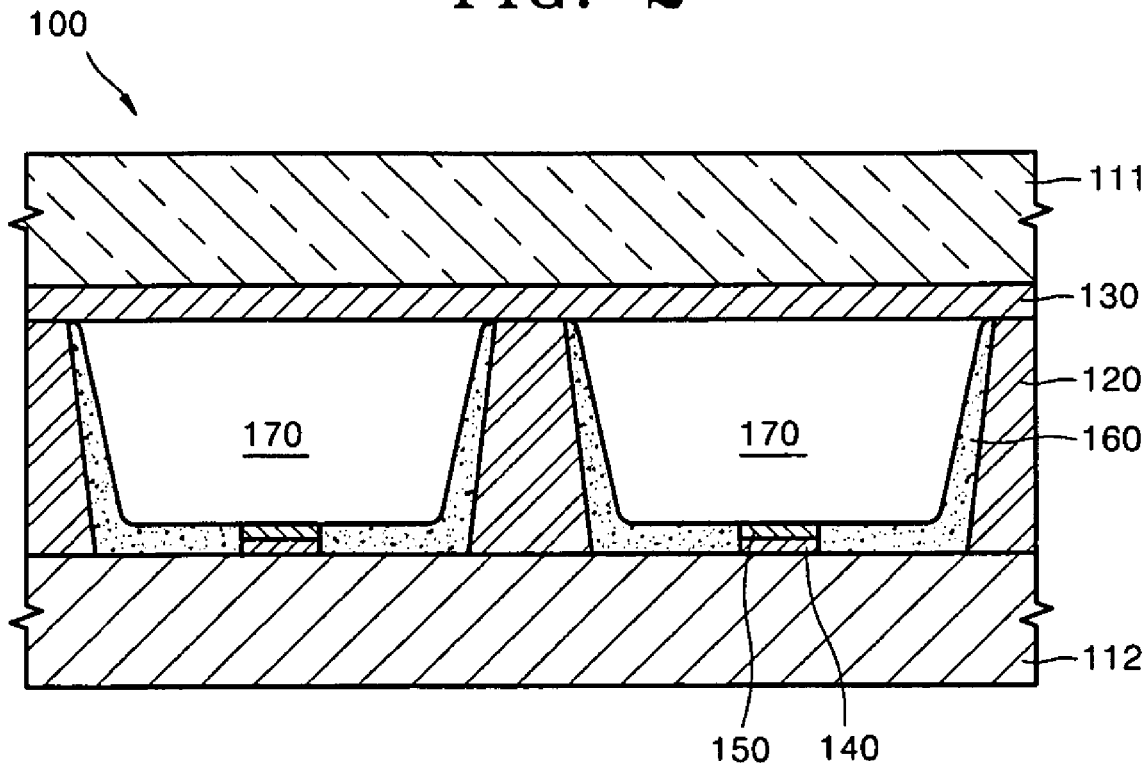
FIG. 2 is a cross-sectional view of the display device taken along line II-II of FIG. 1.

FIG. 1 is a partially cut perspective view of a display device according to an example embodiment of the present invention, and FIG. 2 is a cross-sectional view of the display device taken along line II-II of FIG. 1.

Referring to FIGS. 1 and 2, a display device 100 according to an example embodiment of the present invention includes a first substrate 111, a second substrate 112, barrier ribs 120, anode electrodes 130, a conductive silicon layer 140, an oxidized porous silicon layer 150, and a phosphor layer 160.

The first and second substrates 111 and 112 face each other spaced a predetermined distance apart. In addition, the first substrate 111 is formed of a transparent glass material so that visible light can transmit therethrough.

According to the example embodiment, since the first substrate 111 is transparent, the visible light generated due to a discharge transmit through the first substrate 111, however, the present invention is not limited thereto. That is, the first substrate 111 may not be transparent and the second substrate 112 may be transparent, or both of the first and second substrates 111, 112 can be transparent. In addition, the first and second substrates 111, 112 can be formed of a translucent material, and may include colored filters on surfaces thereof or embedded inside thereof.

The barrier ribs 120 are formed of a dielectric material, and are disposed between the first and second substrates 111 and 112 to define light emitting cells 170 with the first and second substrates 111 and 112.

According to the example embodiment of the present invention, a transverse cross-section of the light emitting cells 170 that are defined by the barrier ribs 120 are formed as squares; however, the present invention is not limited thereto. The transverse cross-section of the light emitting cells 170 may be various shapes such as a polygon, for example, a triangle, a hexagon, or a pentagon, a circular shape, or an oval shape.

The anode electrode 130 is disposed on an inner surface of the first substrate 111, and is formed as a stripe crossing through the light emitting cells 170. In addition, the anode electrode 130 is a transparent electrode formed of an indium tin oxide (ITO).

The anode electrode 130 of the example embodiment is a transparent ITO electrode; however, the present invention is not limited thereto. That is, since the visible light transmits through the first substrate 111 according to the present embodiment, the anode electrode 130 disposed on the lower surface of the first substrate 111 may be formed as the transparent electrode. However, there is no particular limitation to the materials of the anode electrode. For example, the anode electrode of the present invention can be formed of opaque material such as Ag, Cu, or Al.

The anode electrode 130 of the present embodiment is disposed as a stripe on the inner surface of the first substrate 111; however, the present invention is not limited thereto. In other words, the disposing position and shape of the anode electrode 130 are not limited to the example embodiment shown, as long as the anode electrode 130 is located in the light emitting cell 170. For example, the anode electrode 130 can be disposed on the barrier ribs, and can be formed in various shapes. In addition, when the conductive silicon layer 140 is disposed on the second substrate 112 as in the shown embodiment, the anode electrode 130 may be formed on the first substrate 111 in order to make the electrons emitted from the conductive silicon layer 140 flow sufficiently.

The conductive silicon layer 140 is disposed on an inner surface of the second substrate 112 with a predetermined width. In addition, the conductive silicon layer 140 is formed as a stripe that crosses through the light emitting cells 170 and extends in a direction crossing the anode electrode 130.

The conductive silicon layer 140 is formed by doping layered silicon to cause the doped layered silicon to have a conductive property.

The conductive silicon layer 140 of the shown embodiment is disposed on the inner surface of the second substrate 112; however, the present invention is not limited thereto. That is, the conductive silicon layer can be disposed on the first substrate.

The oxidized porous silicon layer 150 is formed as a stripe along the conductive silicon layer 140, and is disposed on an upper surface of the conductive silicon layer 140. It is understood that such terms as upper and lower are relative terms used to facilitate description of the shown embodiment and thus do not limit the shown embodiment to a particular orientation. For example, the shown embodiment is described in a horizontal orientation however, display devices are generally viewed in a vertical or near vertical orientation.

The oxidized porous silicon layer 150 has the same width as that of the conductive silicon layer 140, and accelerates electrons when the electrons are injected into the cell 170.

According to the shown embodiment, when the conductive silicon layer 140 and the oxidized porous silicon layer 150 are formed using the silicon layer 195 (described below and shown in FIG. 4), they have the same width. However, the present invention is not limited thereto. That is, the conductive silicon layer and the oxidized porous silicon layer can be separately formed, and then, the oxidized porous silicon layer can be formed on the conductive silicon layer and on a part of the second substrate around the conductive silicon layer so that the oxidized porous silicon layer can embed the conductive silicon layer.

In addition, nothing is disposed on the oxidized porous silicon layer 150 according to the shown embodiment; however, the present invention is not limited thereto. That is, an emission electrode may be further disposed on the oxidized porous silicon layer, to emit the electrons easily into the light emitting cell.

A dielectric layer 180 may be formed on portions of the lower surface of the first substrate 111, where the anode electrode 130 is not formed. However, the dielectric layer is not required on the portion where the anode electrode 130 is not formed on the lower surface of the first substrate 111 according to the present invention.

The phosphor layer 160 is formed on sides of the barrier ribs 120, and portions of the upper surface of the second substrate 112, that is, the lower surface of the light emitting cell 170, where the conductive silicon layer 140 and the oxidized porous silicon layer 150 are not disposed.

The display device 100 according to the present embodiment includes the phosphor layers 160; however, the present invention is not limited thereto. That is, the display device according to aspects of the present invention need not include the phosphor layer 160. In such a case, visible light that is generated during exciting a gas and discharging the gas can realize images, and since it is difficult to generate visible light of various colors, this case may be used in flat lamps.

The phosphor layers 160 correspond to red, green, and blue light emitting cells 170. The phosphor layer 160 of the present embodiment is formed of a photoluminescence material.

The photoluminescence material forming the phosphor layer 160 has a component that receives ultraviolet rays and emits visible light. A red phosphor layer to emit red visible light includes a phosphor material such as $Y(V,P)O_4$:Eu, a green phosphor layer to emit green visible light includes a phosphor material such as $Zn_2SiO_4$:Mn, and a blue phosphor layer to emit blue visible light includes a phosphor material such as BAM:Eu.

The phosphor layer 160 is formed on side surfaces of the barrier ribs 120, and on portions of the lower surface of the second substrate, that is, the lower surface of the light emitting cell 170 where the conductive silicon layer 140 and the oxidized porous silicon layer 150 are not disposed. However, the present invention is not limited thereto. That is, the phosphor layer 160 can be formed on various portions in the light emitting cell 170, for example, on the lower surface of the first substrate 111, where the phosphor layer 160 can emit visible light by receiving ultraviolet rays in the light emitting cell 170.

The phosphor layer 160 of the shown embodiment is formed of the photoluminescence material; however, the present invention is not limited thereto. That is, the phosphor layer 160 of the present invention may be formed of a cathode luminescence material or quantum dots, using the photoluminescence material, the cathode luminescence material, and quantum dots, or using two or more of the photoluminescence material, the cathode luminescence material, and quantum dots. Here, the cathode luminescence material or the quantum dots may be disposed on the portion of the light emitting cell 170, to which the electrons are directly injected from the oxidized silicon layer 150, and the photoluminescence material may be disposed on the other portion of the light emitting cell 170 to form the phosphor layer 160.

After sealing the first substrate 111 and the second substrate 112 using a frit, a gas is injected between the first and second substrates 111 and 112.

The gas may be Xe, $N_2$, $D_2$, $CO_2$, $H_2$, CO, Ne, He, Ar, air of atmospheric pressure, Kr, or a combination thereof.

A method of fabricating the display device 100 according to an example embodiment of the present invention will be described as follows.

The anode electrode 130 and the dielectric layer 180 are formed on the inner surface of the first substrate 111 using a printing process.

Next, processes of fabricating the second substrate 112 will be described with reference to FIGS. 3 through 8.

FIGS. 3 through 7 are views illustrating processes of forming elements disposed on the second substrate 112 according to an example embodiment of the present invention.

Figure 3:
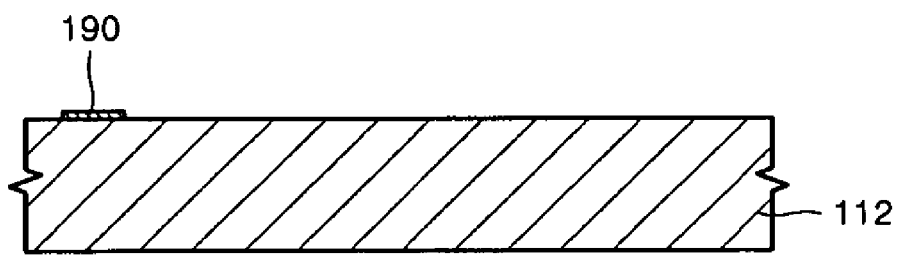
FIGS. 3 through 8 are views illustrating methods of forming elements that are disposed on a second substrate in the display device of FIG. 1.

Referring to FIG. 3, an auxiliary electrode 190 is formed on the inner surface of the second substrate 112, the auxiliary electrode 190 is disposed on an appropriate position so as to be removed easily in a patterning process.

According to the present embodiment, the auxiliary electrode 190 is formed on the inner surface of the second substrate 112; however, the present invention is not limited thereto. That is, the auxiliary electrode 190 of the present invention is to supply electric power to the conductive silicon layer 140 easily, and thus, if the electric power is supplied to the conductive silicon layer 140 sufficiently, the auxiliary electrode 190 is not required.

Figure 4:
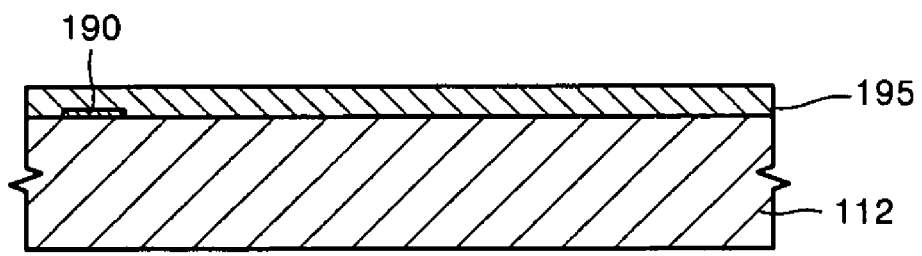

Referring to FIG. 4, a silicon layer 195 is formed on the inner surface of the second substrate 112, and the silicon layer 195 may be formed of polysilicon (polycrystalline silicon) or amorphous silicon.

The silicon layer 195 is formed on the inner surface of the second substrate 112 to a predetermined thickness, while embedding the auxiliary electrode 190. The silicon layer 195 is formed using a plasma enhanced chemical vapor deposition (PECVD) method, for example, at a temperature of 400° C. or lower.

Figure 5:
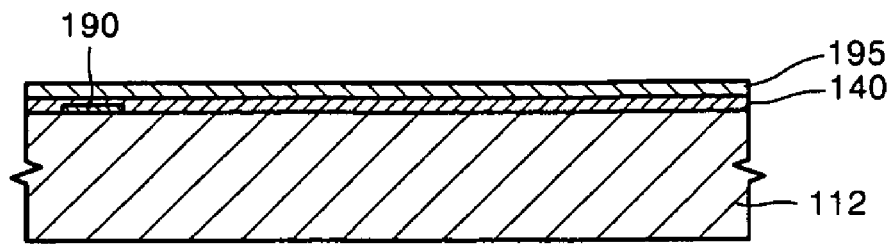

Next, referring to FIG. 5, the conductive silicon layer 140 having a predetermined thickness is formed on a lower portion of the silicon layer 195. That is, a dopant is heavily doped onto the silicon layer 195 using an implanter process so that the dopant can be concentrated on the portion of the silicon layer 195, which contacts the second substrate 112, by controlling an acceleration energy of injection ions. Then, the lower portion of the silicon layer 195 is changed to have electric conductivity, that is, changed into the conductive silicon layer 140.

Figure 6:
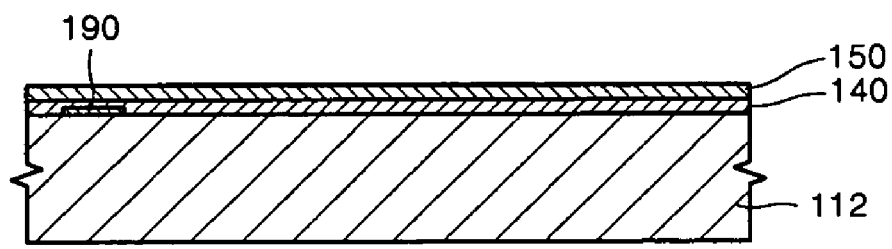

Referring to FIG. 6, electric current of appropriate current density is applied to the conductive silicon layer 140 using the auxiliary electrode 190, and the other portion of the silicon layer 195 except for the conductive silicon layer 140 is anodized using a solution in which HF and ethanol are mixed, to change the remaining portion of the silicon layer 195 to the oxidized porous silicon layer 150.

As described above, the current density is applied to the conductive layer 140 to perform the anodizing process, such that the conductive layer 140 performs as an electrode for performing the anodizing. That is, according to the current embodiment of the present invention, an electrode for the anodizing process is not required, and thus, costs for fabricating the device can be reduced and the light reflection and degradation of the light transmittance due to the additional electrode can be prevented. In other words, when the additional electrode for the anodizing process is formed, the additional electrode exists on the lower surface of the oxidized porous silicon layer 150 after fabricating the device, and thus, the light transmittance may be lowered. Further, when the oxidized porous silicon layer 150 is formed on the first substrate, the additional electrode interferes with the transmission of visible lights.

The portions of the silicon layer 195, except for the conductive silicon layer 140 on the lower portion of the silicon layer 195, are anodized and changed to the oxidized porous silicon layer 150. However, some of the silicon layer 195 may not be changed into either the conductive silicon layer 140 or the oxidized porous silicon layer 150 by controlling the current density to control the anodizing process of the silicon layer 195.

Figure 7:
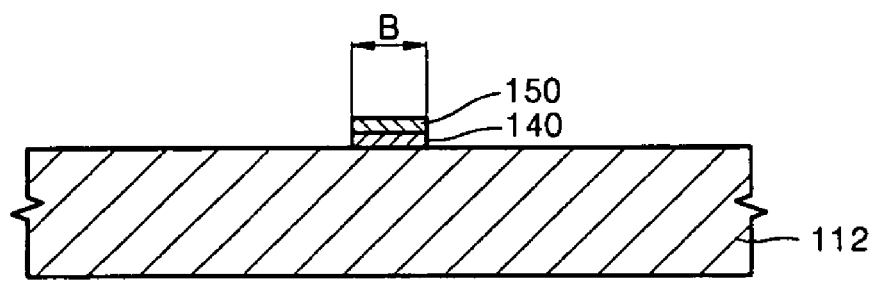

Next, referring to FIG. 7, the conductive silicon layer 140 and the oxidized porous silicon layer 150 are patterned to have a predetermined width (B) using a patterning process. At this time, the auxiliary electrode 190 is also removed.

Figure 8:
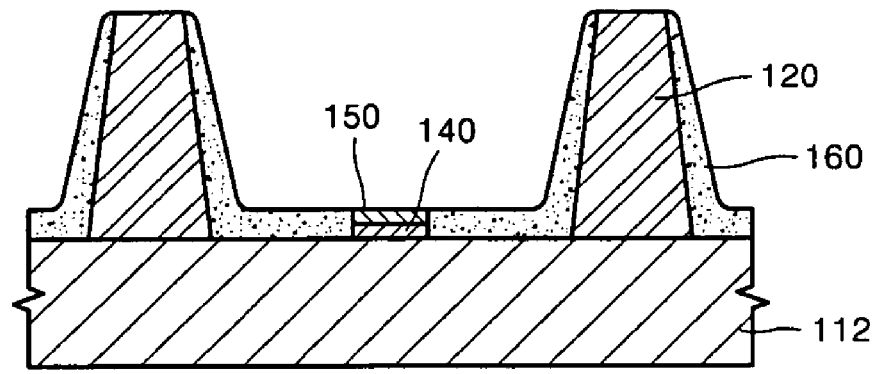

Referring to FIG. 8, the barrier ribs 120 are formed on the second substrate 112, and the phosphor layer 160 is formed by applying the phosphor material on sides of the barrier ribs 120 and the portions on the upper surface of the second substrate 112, where the conductive silicon layer 140 and the oxidized porous silicon layer 150 are not disposed. Thus, the elements disposed on the second substrate 112 are formed.

Next, the first and second substrates 111 and 112 are sealed to each other using a frit, and the gas is injected between the first and second substrates 111 and 112.

Hereinafter, operations of the display device according to the present embodiment will be described.

Voltages are applied to the conductive silicon layer 140 and the anode electrode 130 from external power sources, respectively. When the voltage applied to the conductive silicon layer 140 is $V_1$ and the voltage applied to the anode electrode 130 is $V_2$, the voltages satisfy $V_2 > V_1$.

When the voltages are applied, the electric current flows in the conductive silicon layer 140 performing as a cathode. Then, electrons are injected from the conductive silicon layer 140 to the oxidized porous silicon layer 150, and the electrons injected into the oxidized porous silicon layer 150 are accelerated and emitted to the light emitting cell 170.

The electrons emitted into the light emitting cell 170 excite the gas in the light emitting cell 170, and a plasma discharge may occur by ionization of the gas according to a magnitude of the applied voltage.

The excited gas generates ultraviolet rays while stabilizing, and the ultraviolet rays excite the phosphor layer 160 that is formed of the photoluminescence material. Then, the excited phosphor layer 160 generates visible light while stabilizing, and the generated visible light transmits through the first substrate 111 and displays images.

According to the shown embodiment, the electrons emitted from the oxidized porous silicon layer 150 excite the gas, the excited gas generates the ultraviolet rays while stabilizing, and the generated ultraviolet rays excite the phosphor layer 160 to generate the visible lights. However, the present invention is not limited thereto. That is, the phosphor layer 160 of the present invention may be formed of the cathode luminescence material or quantum dots. In such a case, the electrons directly collide with the phosphor layer 160 without regard to the excitation of the gas, and thus, the visible light can be emitted.

As described above, the display device 100 of the shown embodiment can have the simple structure and can be fabricated using simple processes. Therefore, costs for fabricating the display device 100 can be reduced. In addition, since fine light emitting cells can be formed with the simple light emitting structure, the display device can realize a high resolution.

The inner structure of the display device 100, operations, and fabricating processes according to the above embodiment can be applied to a flat lamp that may be used, for example, as a back light of a liquid crystal display (LCD). That is, the technical features of the display device 100 according to the example embodiment can be applied to the flat lamp, and thus, the flat lamp can adopt the structure, operations, and fabricating processes of the display device 100.

A display device according to another example embodiment of the present invention will be described with reference to FIG. 9, and descriptions for the same elements as the above embodiment will be omitted.

Figure 9:
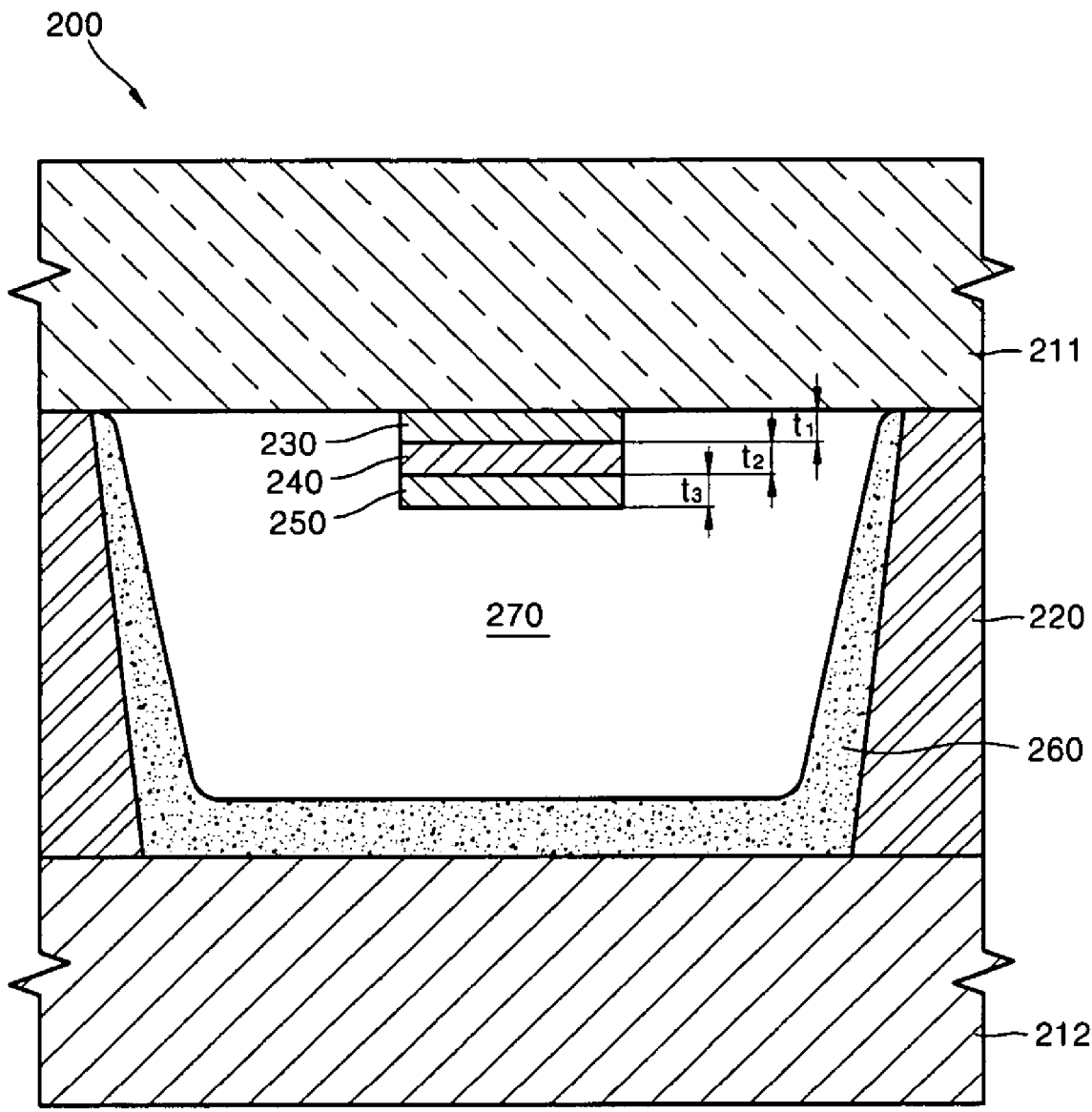
FIG. 9 is a schematic cross-sectional view of a light emitting cell in a display device according to another example embodiment of the present invention.

FIG. 9 is a schematic cross-sectional view of a light emitting cell in a display device according to another embodiment of the present invention.

Referring to FIG. 9, the display device 200 of the another example embodiment of the present invention includes a first substrate 211, a second substrate 212, barrier ribs 220, a conductive silicon layer 230, an oxidized porous silicon layer 240, an emission electrode 250, and a phosphor layer 260.

The first and second substrates 211 and 212 are spaced apart from each other by a predetermined distance. The first substrate 211 is formed of a transparent glass material to transmit visible light.

The barrier ribs 220 are formed of a dielectric material. In addition, the barrier ribs 220 are disposed between the first substrate 211 and the second substrate 212 to define the light emitting cells 270 with the first and second substrates 211 and 212.

The conductive silicon layer 230 with a predetermined width is disposed on an inner surface of the first substrate 212 at each of the light emitting cells 270.

The conductive silicon layer 230 has electric conductivity by being formed through a doping of an amorphous silicon layer.

The oxidized porous silicon layer 240 is disposed on the lower surface of the conductive silicon layer 230. The oxidized porous silicon layer 240 accelerates the electrons injected from the conductive silicon layer 230 into the light emitting cell 270. In addition, the oxidized porous silicon layer 240 is formed by anodizing the amorphous silicon layer.

The emission electrode 250 is formed on the lower surface of the oxidized porous silicon layer 240, and is formed as a mesh so that the electrons that are accelerated by the oxidized porous silicon layer 240 can be emitted easily.

The phosphor layer 260 is formed on sides of the barrier ribs 220, and on an upper surface of the second substrate 212, that is, a lower surface of the light emitting cell 270.

The display device 200 of the present embodiment includes the phosphor layer 260; however, the present invention is not limited thereto. That is, the display device according to the present invention need not include the phosphor layer. In such a case, visible light generated during excitation and discharge of the gas can display the image. However, in this case, it is difficult to realize visible light of various colors, thus the device without the phosphor layer may be limited, for example to the flat lamp or similar applications.

The phosphor layer 260 corresponding to red, green, and blue light emitting cells 270, and the phosphor layer 260 of the shown embodiment are formed of a photoluminescence material and quantum dots.

The photoluminescence material generates visible light when receiving the ultraviolet rays, and the photoluminescence material is the same as that of the phosphor layer 160 according to the previous embodiment. Thus, further description of the photoluminescence material is omitted.

After sealing the first substrate 211 to the second substrate 212 using the frit, the gas is injected between the first and second substrates 211 and 212. The gas may be Xe, $N_2$, $D_2$, $CO_2$, $H_2$, CO, Ne, He, Ar, air of atmospheric pressure, Kr, or a combination thereof.

The method of fabricating the display device 200 according to the current embodiment of the present invention is similar to that of fabricating the display device 100 of the previous embodiment in views of forming the silicon layer, doping the silicon layer, anodizing, and patterning. However, according to the present embodiment, the conductive silicon layer 230 is formed on the first substrate 211, through which the visible light transmits, and the emission electrode 250 is formed on the lower surface of the oxidized porous silicon layer 240. In addition, the display device 200 according to the present embodiment does not additionally include the anode electrode.

Operations of the display device 200 according to the present embodiment will be described as follows.

The conductive silicon layer 230 and the emission electrode 250 are separately formed in each of the light emitting cells 270. Therefore, a direct addressing is performed to select the light emitting cell 270 that will emit the light and apply the electric power to the selected light emitting cell 270.

Voltages are respectively applied to the conductive silicon layer 230 and the emission electrode 250 that are disposed in the selected light emitting cell 270 from an external power source. When the voltage applied to the conductive silicon layer 230 is $V_3$ and the voltage applied to the emission electrode 250 is $V_4$, the voltages satisfy a relation of $V_4 > V_3$.

When the voltages are applied, electric current flows in the conductive silicon layer 230 performing as a cathode. Then, electrons are injected from the conductive silicon layer 230 to the oxidized porous silicon layer 240, and the electrons injected into the oxidized porous silicon layer 240 are accelerated and emitted to the light emitting cell 270 through the emission electrode 250.

The electrons emitted into the light emitting cell 270 excite the gas in the light emitting cell 270, and a plasma discharge may occur due to ionization of the gas according to the magnitude of the applied voltage.

The excited gas emits ultraviolet rays while stabilizing, and the ultraviolet rays excite the phosphor layer 260. Then, the excited phosphor layer 260 generates visible light while stabilizing, and the generated visible light transmits through the first substrate 211 to display the image.

According to aspects of the present embodiment, since multi-layers including the conductive silicon layer 230, the oxidized porous silicon layer 240, and the emission electrode 250 are formed, the visible lights transmitting through the first substrate 211, in particular, the light having a wavelength between 100 nm~1000 nm can have an interference effect by transmitting through the multi-layers. Therefore, the interference of light forming the image can be realized by controlling a ratio between a thickness $t_1$ of the conductive silicon layer 230, a thickness $t_2$ of the oxidized porous silicon layer 240, and a thickness $t_3$ of the emission electrode 250.

As described above, the display device 200 of the shown embodiment has a simple structure, and thus, can be easily fabricated with simple fabricating processes. Therefore, costs for fabricating the display device 200 can be reduced.

In addition, due to the light emitting structure of the display device 200 according to the shown embodiment, fine light emitting cells can be formed easily, and thus, the display device can display the images with a high resolution.

The inner structure, operations, and fabricating processes of the display device 200 according to the shown embodiment can be applied to the flat lamp. That is, technical features of the display device 200 according to the present embodiment, and thus, the flat lamp can adopt the structure, operations, and fabricating processes of the display device 200.

As described above, the display device and the flat lamp according to aspects of the present invention can have simple structures, and can be fabricated using simple processes. Therefore, costs for fabricating the display device and the flat lamp can be reduced.

In addition, since the display device and the flat lamp according to aspects of the present invention have a simple light emitting structure, fine light emitting cells can be formed. Thus, the display device can display the images with a high resolution.

In addition, when fabricating the display device and the flat lamp according to aspects of the present invention, the conductive silicon layer performs as the electrode for anodizing, and thus, an additional electrode for performing the anodizing is not required. Therefore, costs for fabricating the display device or the flat lamp can be reduced, and light reflection from the additional electrode can be prevented such that the light transmittance is not degraded.

According to aspects of the present invention, multi-layers including the conductive silicon layer and the oxidized porous silicon layer can be disposed on the substrate, through which the visible light transmits. Then, the visible light transmits through the multi-layers to display the images, and thus, desired interference effect of light can be realized by the multi-layers.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A display device comprising:
a first substrate and a second substrate arranged and spaced apart by a predetermined distance;
barrier ribs to define a light emitting cell between the first substrate and the second substrate;
an anode electrode disposed in the light emitting cell;
a conductive silicon layer disposed on an inner surface of one of the first substrate and the second substrate;
an oxidized porous silicon layer, at least a portion of which is disposed on the conductive silicon layer;
a gas filled in the light emitting cell, which is excited when a voltage is applied to the conductive silicon layer; and
a phosphor layer disposed in the light emitting cell, comprising a photoluminescent phosphor.

2. The display device of claim 1, wherein the long axis of the anode electrode extends in a first direction, and the long axis of the conductive silicon layer extends in a second direction that is generally orthogonal to the first direction.

3. The display device of claim 1, wherein the conductive silicon layer is formed by doping a polysilicon layer, and the oxidized porous silicon layer is an oxidized porous polysilicon layer.

4. The display device of claim 3, further comprising a polysilicon layer between the conductive silicon layer and the oxidized porous silicon layer.

5. The display device of claim 1, wherein the conductive silicon layer is formed by doping an amorphous silicon layer, and the oxidized porous silicon layer is an oxidized porous amorphous silicon layer.

6. A display device comprising:
a first substrate and a second substrate arranged and spaced apart by a predetermined distance;
barrier ribs to define a light emitting cell between the first substrate and the second substrate;
an anode electrode disposed in the light emitting cell;
a conductive silicon layer disposed on an inner surface of one of the first substrate and the second substrate;
an oxidized porous silicon layer, at least a portion of which is disposed on the conductive silicon layer;
a gas filled in the light emitting cell; and
an amorphous silicon layer disposed between the conductive silicon layer and the oxidized porous silicon layer.

7. The display device of claim 1, wherein an emission electrode is disposed on the oxidized porous silicon layer.

8. The display device of claim 1, wherein the phosphor layer further comprises one selected from the group consisting of a cathodoluminescent phosphor, quantum dots, and a combination thereof.

9. The display device of claim 1, wherein the gas comprises one selected from the group consisting of Xe, $N_2$, $D_2$, $CO_2$, $H_2$, CO, Ne, He, Ar, air of atmospheric pressure, Kr, and a combination thereof.

10. A flat lamp comprising:
a first substrate and a second substrate arranged and spaced apart by a predetermined distance;
barrier ribs to define a light emitting cell between the first substrate and the second substrate;
an anode electrode disposed in the light emitting cell;
a conductive silicon layer disposed on an inner surface of one of the first substrate and the second substrate;
an oxidized porous silicon layer, at least a portion of which is disposed on the conductive silicon layer;
a gas filled in the light emitting cell, which is excited when a voltage is applied to the conductive silicon layer; and
a phosphor layer disposed in the light emitting cell, comprising a photoluminescent phosphor.

11. The flat lamp of claim 10, wherein the phosphor layer further comprises one selected from the group consisting of a cathodoluminescent phosphor, a quantum dot, and a combination thereof.

12. A display device comprising:
a first substrate and a second substrate arranged and spaced apart by a predetermined distance;
barrier ribs to define a light emitting cell between the first substrate and the second substrate;
a conductive silicon layer disposed on an inner surface of one of the first substrate and the second substrate;
an oxidized porous silicon layer, at least a portion of which is disposed on the conductive silicon layer;
an emission electrode, at least a portion of which is disposed on the oxidized porous silicon layer;
a gas filled in the light emitting cell, which is excited when a voltage is applied to the conductive silicon layer; and
a phosphor layer disposed in the light emitting cell, comprising a photoluminescent phosphor.

13. The display device of claim 12, wherein the conductive silicon layer is formed by doping a polysilicon layer, and the oxidized porous silicon layer is an oxidized porous polysilicon layer.

14. The display device of claim 13, further comprising a polysilicon layer between the conductive silicon layer and the oxidized porous silicon layer.

15. The display device of claim 12, wherein the conductive silicon layer is formed by doping an amorphous silicon layer, and the oxidized porous silicon layer is an oxidized porous amorphous silicon layer.

16. A display device comprising:
a first substrate and a second substrate arranged and spaced apart by a predetermined distance;
barrier ribs to define a light emitting cell between the first substrate and the second substrate;
a conductive silicon layer disposed on an inner surface of one of the first substrate and the second substrate;
an oxidized porous silicon layer, at least a portion of which is disposed on the conductive silicon layer;
an emission electrode, at least a portion of which is disposed on the oxidized porous silicon layer;
a gas filled in the light emitting cell; and an amorphous silicon layer between the conductive silicon layer and the oxidized porous silicon layer.

17. The display device of claim 16, wherein the phosphor layer further comprises one selected from the group consisting of a cathodoluminescent phosphor, a quantum dot, and a combination thereof.

18. The display device of claim 12, wherein the gas comprises one selected from the group consisting of Xe, $N_2$, $D_2$, $CO_2$, $H_2$, CO, Ne, He, Ar, air of atmospheric pressure, Kr, and a combination thereof.

19. A flat lamp comprising:
- a first substrate and a second substrate arranged and spaced apart by a predetermined distance;
- barrier ribs to define a light emitting cell between the first substrate and the second substrate;
- a conductive silicon layer disposed on an inner surface of one of the first substrate and the second substrate;
- an oxidized porous silicon layer, at least a portion of which is disposed on the conductive silicon layer;
- an emission electrode, at least a portion of which is disposed on the oxidized porous silicon layer;
- a gas filled in the light emitting cell, which is excited when a voltage is applied to the conductive silicon layer; and
- a phosphor layer disposed in the light emitting cell, comprising a photoluminescent phosphor.

20. The flat lamp of claim 19, wherein the phosphor layer further comprises one selected from the group consisting of a cathodoluminescent phosphor, a quantum dot, and a combination thereof.

* * * * *